United States Patent [19]
Johnson

[11] Patent Number: 5,122,933
[45] Date of Patent: Jun. 16, 1992

[54] PERIMETER MESSAGE AND CLEARANCE LIGHTING FOR CARGO VEHICLE CONTAINER BODY

[76] Inventor: Glenn M. Johnson, 1218 Willowgreen Ct., Westlake Village, Calif. 91361

[21] Appl. No.: 653,242

[22] Filed: Feb. 11, 1991

[51] Int. Cl.⁵ .............................. F21V 7/04
[52] U.S. Cl. ...................... 362/32; 362/80; 362/812; 362/375
[58] Field of Search .............. 362/31, 32, 61, 74, 362/80, 83.3, 375, 455, 812, 374; 40/547, 556

[56] References Cited

U.S. PATENT DOCUMENTS

| | | | |
|---|---|---|---|
| 3,582,640 | 6/1971 | Ellard | 362/74 |
| 4,460,942 | 7/1984 | Pizzuti et al. | 362/375 |
| 4,839,776 | 6/1989 | Grossnickle | 362/31 |
| 4,924,612 | 5/1990 | Kopelman | 40/547 |
| 4,947,293 | 8/1990 | Johnson et al. | 362/74 |
| 4,975,809 | 12/1990 | Ku | 40/547 |
| 4,977,487 | 12/1990 | Okano | 362/32 |
| 5,009,020 | 4/1991 | Watanabe | 362/32 |
| 5,036,435 | 7/1991 | Tokuda et al. | 362/31 |

Primary Examiner—Ira S. Lazarus
Assistant Examiner—D. M. Cox
Attorney, Agent, or Firm—Harvey S. Hertz; William T. O'Neil

[57] ABSTRACT

An elongated, lighted message and clearance lighting assembly for mounting into the conventional generally horizontal indentation adjacent the roof line of a cargo vehicle container body. A pair of elongated fiber-optic cables are individually encased in a correspondingly elongated enclosure to illuminate the interior of said enclosure and pass light through an outward translucent face of the enclosure to present a graphic message provided on a translucent strip inside the enclosure. The fiber-optic cables are constructed to propagate light flux longitudinally and also radially outward. A portion of the translucent face of the enclosure may be colored appropriately to provide the legally required clearance lighting function.

10 Claims, 2 Drawing Sheets

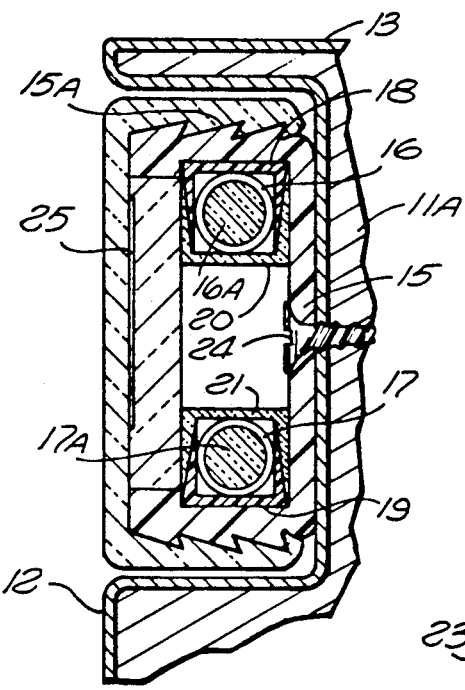
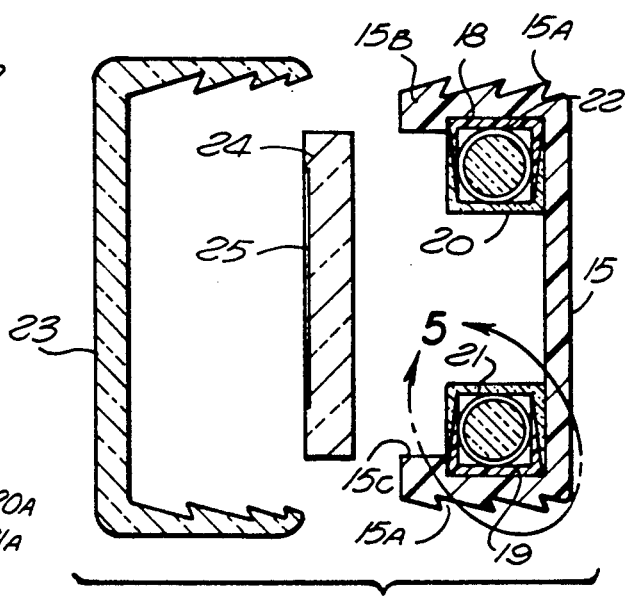
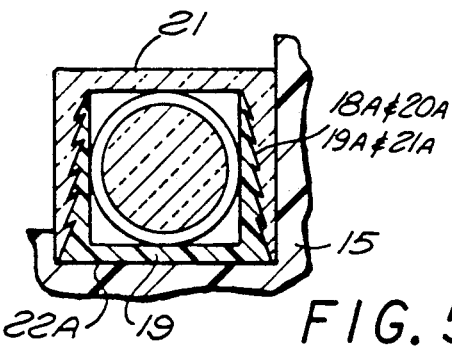
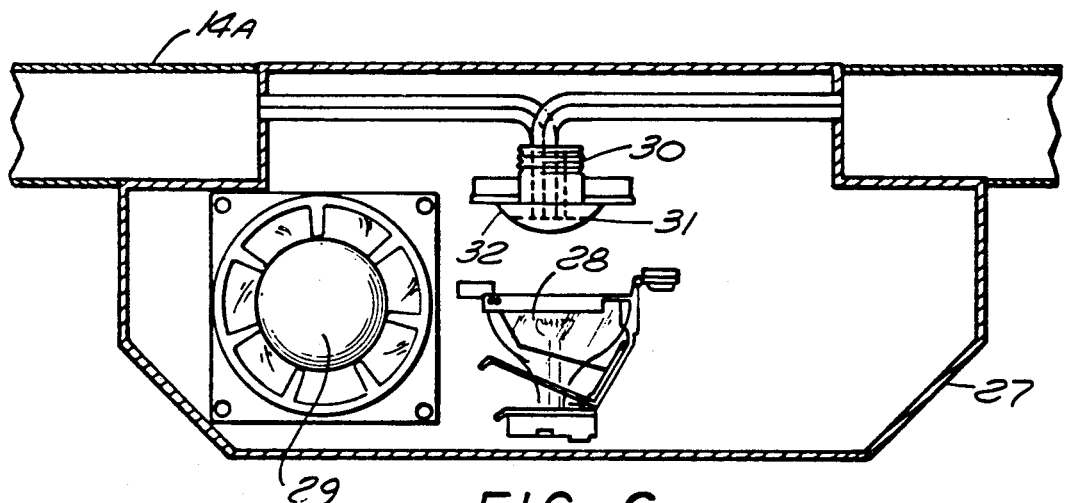

PERIMETER MESSAGE AND CLEARANCE LIGHTING FOR CARGO VEHICLE CONTAINER BODY

BACKGROUND OF THE INVENTION

The invention relates generally to illuminated messages, symbols or emblems for night visibility from the side of a vehicle cargo body or the like. The invention relates more specifically to the use of optical fiber technology to back-light a translucent panel carrying the message, symbols or emblems.

In the prior art, vehicle bodies have been painted with advertising and other messages. Obviously, such messages are not clearly visible at night. Such well-known arrangements as sign illumination using incandescent lamps, fluorescent lighting or even neon tube signs are known. However, all such prior art arrangements are expensive, fragile (especially the neon tubes) and require significant levels of maintenance.

Highway cargo vehicles of the semi-trailer or full trailer type are conventionally constructed as separate chassis units with container bodies mounted thereon and are pulled by tractor units.

The use of fiber-optic structures to convey light longitudinally and at the same time provide the needed lateral emission is known. U.S. Pat. No. 4,763,984 discloses an arrangement including a plurality of optic fibers extending in lateral juxtaposition in a plane to effect enhanced lateral light flux emission. However, that reference contains no disclosure of the unique structure of the invention.

In the usual fiber-optic system, longitudinal light signal conveyance is optimized and lateral transmission is minimized, the latter being regarded as undesired leakage. In such instances, the optical fiber core and cladding are constructed in accordance with well-known criteria to effect light flux propagation in lower order and fundamental modes.

The aforementioned U.S. Pat. No. 4,763,984 describes some principles, methods and structural variations in respect to optic fiber core size and other parameters for producing a desired ratio of longitudinal conveyance to lateral emission through a translucent cladding.

Other known prior art disclosing uses of lateral emissions from an end-energized light guide (optic fiber cable) includes U.S. Pat. Nos. 2,479,500 and 2,808,502.

Apparatus employing a specialized optic fiber light pipe is disclosed in U.S. Pat. No. 4,947,293. The applicant herein is the same as the patentee of that prior patent. The arrangement of U.S. Pat. No. 4,947,293 provides vehicle cargo body top perimeter lighting but shows no provision for illuminating any kind of message.

SUMMARY

In consideration of the disadvantages of the prior art and the lack of comparable art, it may be said to have been the general objective of the invention to provide low-maintenance, inexpensive, easily-installed apparatus for illuminating an advertising or other message along the top perimeter of a vehicle cargo (container) body.

Fiber-optic cables designed to propagate light flux longitudinally and also laterally outward through translucent outer cladding are known in the prior art as hereinbefore indicated and this knowledge is relied upon in the novel combination.

An elongated enclosure of generally rectangular cross-section containing at least one fiber-optic cable is installed in the cargo vehicle container body recess adjacent to the roof line thereof. That enclosure includes a translucent window (outward facing panel) and a reflective interior. Preferably two fiber-optic cables are employed in each enclosure to provide adequate illumination through the aforementioned window. One such enclosure is installed on each side of the container body and both preferably extend along the full cargo container length substantially to the rear corners thereof. At the front of the container body the cable enclosures with cables therein are bent 90 degrees around the front corners of the cargo container and are coupled into a light source assembly. Therein a high-brightness light source illuminates the forward ends of all optic fiber cables to both container body sides.

The details of a preferred embodiment according to the invention will be evident as this description proceeds.

BRIEF DESCRIPTION OF THE DRAWINGS

FIG. 3 is a cross-sectional view of the optical fiber enclosure assembly taken as indicated on FIG. 2;

FIG. 4 is an exploded view of FIG. 3 illustrating assembly procedure;

FIG. 5 is an exaggerated sectional view of one of the optical cable support structures of FIG. 4; and FIG. 6 is a sectional view of the light source assembly as indicated on FIG. 1.

DETAILED DESCRIPTION

Figure 1:
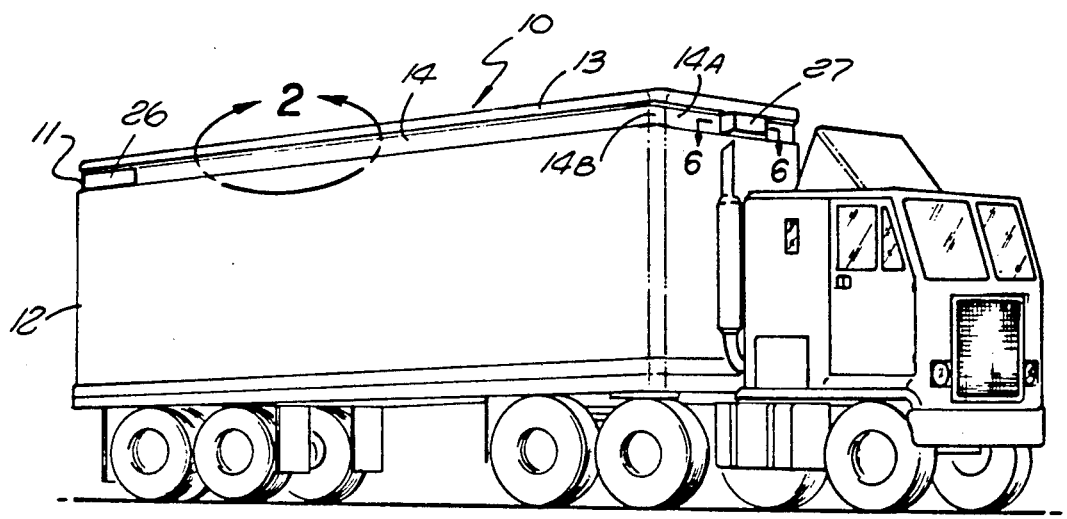
FIG. 1 is a pictorial presentation of a typical five axle tractor/trailer assembly in which the invention may be employed.

Referring to FIG. 1 of the drawings, a pictorial representation of a typical tractor/trailer assembly is depicted at 10. A conventional trough or indentation 11 about the sides and front of container body 12 provides a generally horizontal elongated pocket adjacent to the roof line 13 of container body 12 for emplacement of the containment enclosures, (typically 14 and 14A), therein. These containment enclosures 14 and 14A seat within the indentations along the sides and front of the container body (port side not shown). The corner bend at 14B is accomplished by means of a curved enclosure piece at 14B designed to permit an optical fiber bend radius not less than 20 times the optics cable diameter with a commercially available fiber optic cable to be identified hereinafter.

Figure 2:
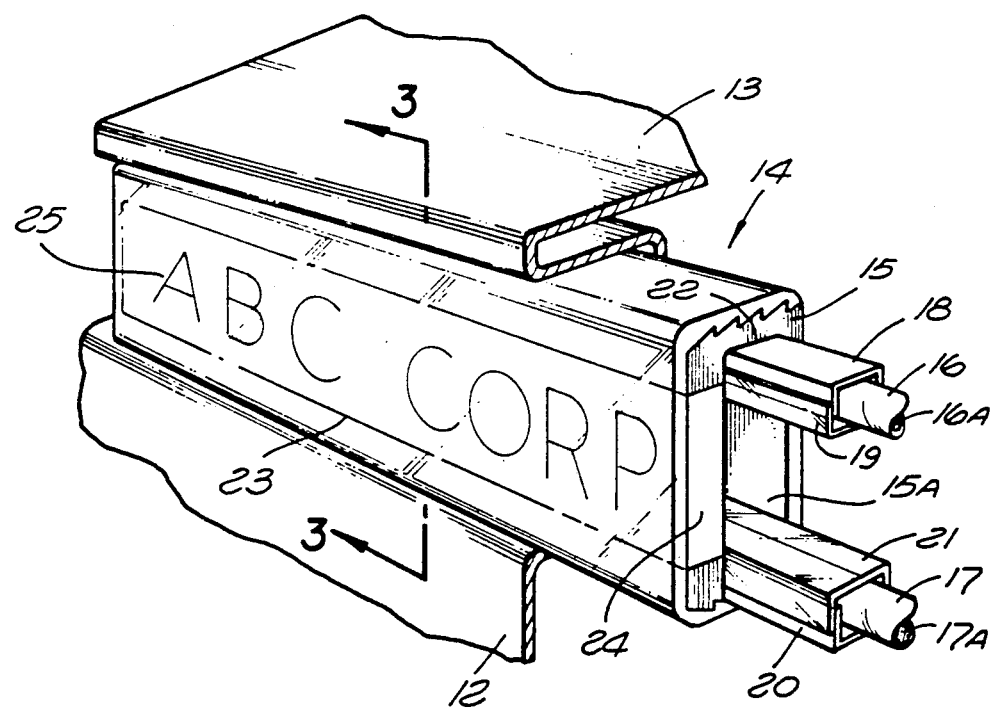
FIG. 2 is a sectional cut-away portion section of the optical fibers with enclosure and support structure at a position along the container body as indicated in FIG. 1.

In FIG. 2, the enclosure 14 is shown in section, seated in the container body indentation 11. A track extrusion 15 is affixed to the inside wall 11A of indentation 11. Reference is also made to FIG. 3 for more detail in respect to this aspect of the installation.

Considering also FIG. 3, two fiber-optic cables having polyfilimer cores 16A and 17A and polytetrafluoroethylene cladding 16 and 17 are employed.

That cladding material is also known as TEFLON, a trademark of E. I. DuPont Nemours and Company. The material of cores 16A and 17A may be bundled glass fibers or the like of known type selected to cooperate with the TEFLON cladding to generate the modes which effect longitudinal and radially outward light propagation. Cables meeting these requirements are commercially available, for example from Lumenyte International Corporation of Chatsworth, Calif. under the trade name LUMENYTE.

The individual extrusions 18 and 19 are attached, as by a cementing agent, to the interior interfacing surfaces of extrusion 15, for example, along interface 22 and the comparable surface of extrusion 19. Extrusions (channels) 15, 18 and 19 are formed of a white plastic material such as white ABS for reflective qualities and are extruded with sawtooth edges at 15A, 18A and 20A, typically (at FIG. 5). Mating channel cap extrusions 20, 21 and 23 are of a clear plastic material such as LEXAN. All plastic parts are preferably ultraviolet light treated to extend their lives in the environmental exposure.

A screw 24 is shown in FIG. 3 to attach channel 15 to the container body at wall 11A. However, it will be understood that a cementing agent or other conventional attachment means could be substituted.

The preferred structure for including the advertising or other message is by insertion of a separate clear plastic strip 24 resting inside and against plastic cap 23 and contained between shoulders 15B and 15C on extrusion 15. Strip 24 may also be of the aforementioned LEXAN material and the message 25 is applied therein as indicated at 25 on FIGS. 1, 3 and 4. The assembly of FIG. 3 shows this arrangement after the elements of FIG. 4 are pushed together to lock the aforementioned sawtooth engagement surfaces together.

In addition to the message 25, which may be applied by paint, stencil, silk screening or other conventional methods, a colored (red, for example) piece may be added to strip 24 to provide legally required clearance lighting. See piece 26 on FIG. 1.

FIG. 5 is exaggerated in size to more clearly show the assembled nature of the individual fiber-optic cable support structures.

Referring now to FIG. 6, a sectional view of the typical light source (illuminator) box 27 as identified on FIG. 1 is shown. The assembled enclosure of FIG. 2 is to be understood to continue around the front corners of the container body, typically at corner 14B on FIG. 1, and provide the same illuminated message capability between the container body front corners and the centrally located illuminator 27.

In illuminator 27, the fiber-optic cable pair ends are directed toward a high intensity focused light source 28. That light source may be of the quartz halogen type. A lamp of that type provides the desired light intensity, but generates substantial heat as a side effect. Accordingly, the enclosure of illuminator 27 is preferably a metal casting having external heat dissipating fins (not shown). Also, a cooling fan 29 is preferably included.

The four fiber-optic cables of the preferred combination are held in a glass or plastic connector 30 with their input ends arranged in an array in a plane 31. The shape of the connector 30 at junction 32 has no optical significance and could, therefore, be varied. It sole function is to hold the optic cable ends in a common plane 31 and to preserve their aim toward the focused light from source 28.

A very significant advantage of the invention is the relative freedom from maintenance of the system. Only the illuminator requires occasional maintenance. Furthermore, there is no hazard of electrical short circuits along the container body since the optical fibers carry no current.

The snap-together assembly of the apparatus of the invention provides a very economical installation.

Various modifications may be undertaken within the spirit of the invention once the basics of the novel combination are understood. For one example, a colored display may be achieved by insertion of an appropriate dichroic filter between light source 28 and the optical fiber array at plane 31 (FIG. 6). Such filters are well-known in the art. Accordingly, it is not intended that the scope of the invention should be regarded as limited by the drawings or this description, these being typical and illustrative only.

I claim:

1. In a highway cargo vehicle including at least one chassis-mounted container body adapted to be drawn by a tractor unit, said container body having an elongated recessed indentation extending horizontally and adjacent to the roof line of said container body, the combination comprising:

an elongated enclosure mounted within said indentation, said enclosure having a light transmissive surface facing outward from said container body, said enclosure having a light reflective internal surface opposite said light transmissive surface;

at least one elongated fiber-optic cable mounted within said enclosure to illuminate the interior of said enclosure and transmit light through said light-transmissive outward-facing surface, said fiber-optic cable having core and cladding materials which cooperate to support light propagation along the length of said cable and also radially outward to provide said enclosure illumination;

a light source arranged to illuminate an end of said optic cable;

and a translucent strip inserted into said enclosure between said outward-facing light transmissive, outward-facing surface and said fiber-optic cable, said strip containing message characters visible from outside said container body, said translucent strip thereby being back-lighted.

2. The combination according to claim 1 in which two fiber-optic cables are mounted generally parallel within said enclosure and are vertically spaced for illuminating said enclosure interior and therefore said translucent strip uniformly.

3. The combination according to claim 2 in which said fiber optic cables are each contained in a reflective plastic channel with a translucent channel cap thereover for illuminating the interior of said enclosure and, therefore, said translucent strip.

4. The combination according to claim 3 in which said reflective plastic channels and said translucent channel caps and said channels have mating sawtooth surfaces to lock together upon application of a mating force.

5. The combination according to claim 1 in which a portion of said translucent strip is colored translucent plastic material at a predetermined location along the length of said elongated enclosure to provide clearance lighting.

6. The combination according to claim 3 in which a portion of said translucent plastic strip is of a predetermined color over a predetermined portion of its length to provide clearance lighting.

7. A combined lighted message and clearance lighting system for installation within an elongated trough extending generally horizontally and adjacent to the roof line of a cargo vehicle container body comprising:

an elongated enclosure mounted within said trough, said enclosure having illuminating means therein in the form of at least one end-illuminated, correspondingly elongated fiber-optic cable of the type having a translucent core surrounded by continuous translucent cladding, said core and cladding cooperating to provide outward light transmission and light propagation along the length of said cable to illuminate the interior of said enclosure;

a translucent outward facing side of said enclosure providing a window for emission of said light laterally outward;

first means comprising a partially translucent strip containing message information, said strip being associated with said window to provide an illuminated message visible outside said cargo vehicle;

and second means associated with said partially translucent strip for producing a colored light emission along a predetermined portion of said translucent strip to provide clearance lighting.

8. The combination according to claim 7 in which said at least one fiber-optic cable is at least two end-illuminated fiber optic cables extending generally parallel over substantially the entire length of said enclosure.

9. The combination according to claim 7 in which said end illumination is provided by an enclosed light source at a central location along the front of said container body and said at least one fiber-optic cable comprises two cables running generally parallel within said enclosure on each side of said container body.

10. In a highway cargo vehicle including at least one chassis-mounted container body adapted to be drawn by a tractor unit, said container body having an elongated, recessed indicator extending horizontally and adjacent to the roof line of said container body, the combination comprising:

an elongated enclosure mounted within said indentation, said enclosure having a light-transmissive surface facing outward from said body;

a pair of elongated light-transmitting fiber-optic cables mounted with said enclosure to illuminate the interior of said enclosure and transmit light through said light-transmissive outward-facing surface, said fiber-optic cables having core and cladding materials which cooperate to support light propogation along the length of said cables and also laterally outward to provide said enclosure illumination;

a light source for illuminating one end of said optical cables;

means composing a reflective plastic channel for supporting each of said fiber-optic cables within said enclosure in generally parallel and vertically spaced relationship;

a translucent channel cap for each of said reflective channels, said channels and said channel caps having mating sawtooth surfaces to lock together upon application of a mating force;

a translucent strip inserted into said enclosure between said outward-facing surface and said cable channel caps, said strip containing message characters which are thereby back-lighted to be visible from outside said container body.

* * * * *